(12) United States Patent
Kim

(10) Patent No.: US 9,059,624 B2
(45) Date of Patent: Jun. 16, 2015

(54) ACTIVE DYNAMIC VIBRATION ABSORBER

(71) Applicant: Hyundai Motor Company, Seoul (KR)

(72) Inventor: Jang Ho Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 127 days.

(21) Appl. No.: 14/033,810

(22) Filed: Sep. 23, 2013

(65) Prior Publication Data

US 2014/0159515 A1 Jun. 12, 2014

(30) Foreign Application Priority Data

Dec. 7, 2012 (KR) ........................ 10-2012-0142060

(51) Int. Cl.
| | |
|---|---|
| *F16F 13/26* | (2006.01) |
| *H02K 33/04* | (2006.01) |
| *F16F 15/03* | (2006.01) |
| *F16F 7/10* | (2006.01) |
| *H02K 33/16* | (2006.01) |
| *H02K 13/00* | (2006.01) |

(52) U.S. Cl.
CPC ................ *H02K 33/04* (2013.01); *F16F 15/03* (2013.01); *F16F 7/1011* (2013.01); *H02K 33/16* (2013.01); *H02K 13/006* (2013.01)

(58) Field of Classification Search
CPC ......... F16F 7/1011; F16F 7/116; F16F 15/03; H02K 33/02; H02K 33/04; H02K 33/06; H02K 35/02; H02K 2203/06; H02K 2203/09
See application file for complete search history.

(56) References Cited

U.S. PATENT DOCUMENTS

| 3,525,887 | A | * | 8/1970 | Ewart, Jr. ........................ 310/27 |
| 5,896,961 | A | | 4/1999 | Aida et al. |
| 5,947,457 | A | * | 9/1999 | Swanson et al. ......... 267/140.14 |
| 7,923,955 | B2 | | 4/2011 | Shin et al. |
| 2002/0053764 | A1 | * | 5/2002 | Goto et al. ............... 267/140.14 |
| 2004/0201290 | A1 | * | 10/2004 | Razzaghi ........................ 310/15 |
| 2005/0006830 | A1 | * | 1/2005 | Nemoto ................... 267/140.14 |
| 2006/0061442 | A1 | * | 3/2006 | Brooks .......................... 335/220 |
| 2008/0007125 | A1 | * | 1/2008 | Koyama et al. ................. 310/27 |
| 2013/0049491 | A1 | * | 2/2013 | Kim ................................ 310/25 |

FOREIGN PATENT DOCUMENTS

| JP | 2010106998 A | 5/2010 |
| KR | 10-0534823 | 3/2005 |
| KR | 10-2011-0139340 | 12/2011 |

* cited by examiner

*Primary Examiner* — Bradley King
(74) *Attorney, Agent, or Firm* — Mintz Levin Cohn Ferris Glovsky and Popeo, P.C.; Peter F. Corless

(57) ABSTRACT

An active dynamic vibration absorber includes: a coil part provided inside a housing and wound with a coil; a yoke part that moves with respect to the coil part when current flows in the coil part, and includes an upper yoke, a lower yoke, and a permanent magnet provided between the upper yoke and the lower yoke; springs mounted to the yoke part so as to switch a movement of the yoke part to a vibration; first and second slide protrusions electrically connected to both ends of the coil of the coil part, upper and lower contact protrusions formed in the yoke part to correspond to the first and second slide protrusions; and first and second drive devices that generate a relative movement between the coil part and the yoke part by selectively applying current to the upper and lower contact protrusions according to a control signal.

10 Claims, 7 Drawing Sheets

ACTIVE DYNAMIC VIBRATION ABSORBER

CROSS-REFERENCE TO RELATED APPLICATION

This application claims under 35 U.S.C. §119(a) priority to and the benefit of Korean Patent Application No. 10-2012-0142060 filed in the Korean Intellectual Property Office on Dec. 7, 2012, the entire contents of which are incorporated herein by reference.

BACKGROUND (a) Field of the Invention

The present invention relates to an active dynamic vibration absorber, and more particularly, to an active dynamic vibration absorber capable of effectively generating vibration by switching a direction of current applied to a coil part with a simple configuration.

(b) Description of the Related Art

In general, a dynamic vibration absorber is a device for decreasing vibration by generating an anti-node for generated vibration, and is widely used as a device for attenuating vibration in a vehicle.

An active dynamic vibration absorber includes a spring, a mass body, and a driving device capable of making the mass body reciprocate. In particular, in an active dynamic vibration absorber including an electromotive driving device among the active dynamic vibration absorbers, a mass body is fixed to a case by using a spring, and the mass body including a yoke and a permanent magnet and a separate coil part are disposed, so that the mass body reciprocates by Lorentz force generated by applying current to a coil. Through this, inertia force (control force) of the mass body is generated, and the inertia force (control force) is transferred to the case fixed to the vibration body (a chassis of a vehicle body, and the like) through the spring. As a result, vibration force transferred from the vibration body through an insulation system is attenuated, so that the vibration is decreased.

A vibration decrease principle of the active dynamic vibration absorber to which the aforementioned electromotive driving device is applied will be described. As illustrated in FIG. 1 (RELATED ART), an active dynamic vibration absorber 101 is operated so that a mass body 103 reciprocates, and inertia force (control force) is generated by the reciprocating mass body 103.

The number of vibrations (frequency) is variable according to an applied current or voltage, and when the inertia force has a phase opposite to the vibration desired to be decreased, the vibration is decreased by attenuating the target vibration desired to be decreased, that is, vibration force transferred to a vibration body 105.

The number of excitation vibrations (excitation frequency) desired to be decreased may be changed by controlling an operation current applied to the active dynamic vibration absorber 101 or a frequency of a voltage, and a size of inertia force (control force) may also be changed by controlling the operation current or a size of the voltage.

A general active dynamic vibration absorbing system includes an accelerometer for sensing a size, a frequency, and a phase of a vibration of a chassis and outputting a corresponding signal, and a controller for controlling the active dynamic vibration absorber 101 by receiving the corresponding signal of the accelerometer and an engine rotation speed signal.

In the active dynamic vibration absorber 101 having the aforementioned configuration, when current is applied to a coil through a drive device and then stops, back electromotive force (counter electromotive force) is generated while energy left in the coil flows in a reverse direction. In this case, when a large back electromotive force is generated, the drive device may be damaged. In order to prevent this problem, it is possible to use a method of protecting the drive device by installing a diode between a coil part and a power part in a reverse direction, and making the back electromotive force be absorbed at a side of the power unit.

However, the aforementioned active dynamic vibration absorber 101 of the related art needs to selectively control only a target frequency desired to be attenuated, so that it is necessary for a control signal to have a sinusoidal waveform. Accordingly, there is a problem in that a design of an output unit of the controller becomes complex, and a manufacturing cost is increased because free wheeling needs to be implemented by using a diode and the like in order to protect a device and improve efficiency, and an H-Bridge circuit needs to be applied in order to generate a control signal in a forward direction (+) and a reverse direction (−).

The above information disclosed in this Background section is only for enhancement of understanding of the background of the invention and therefore it may contain information that does not form the prior art that is already known in this country to a person of ordinary skill in the art.

SUMMARY

The present invention provides an active dynamic vibration absorber capable of switching a direction of current and effectively generating a control vibration with a simple configuration.

An exemplary embodiment of the present invention provides an active dynamic vibration absorber including: a coil part provided inside a housing and wound with a coil; a yoke part that moves with respect to the coil part when current flows in the coil part, where the yoke part has a predetermined mass, and includes an upper yoke, a lower yoke, and a permanent magnet provided between the upper yoke and the lower yoke; springs mounted to the yoke part so as to switch a movement of the yoke part to a vibration; first and second slide protrusions electrically connected to both ends of the coil of the coil part, respectively, and protruding from an exterior circumferential surface of the coil part; a plurality of upper and lower contact protrusions formed in the yoke part to correspond to the first and second slide protrusions, and being selectively in contact with the first and second slide protrusions, respectively; and first and second drive devices electrically connected to the upper and lower contact protrusions, respectively, and generating a relative movement between the coil part and the yoke part by selectively applying current to the respective upper and lower contact protrusions according to a control signal.

The first and second slide protrusions may be provided on the exterior circumferential surface of the coil part spaced apart from each other by a predetermined interval.

The upper contact protrusions may include a first upper contact protrusion which is selectively in contact with the first slide protrusion, and a second upper contact protrusion which is selectively in contact with the second slide protrusion, such that when the first slide protrusion is in contact with the first upper contact protrusion, the second slide protrusion is in contact with the second upper contact protrusion, and when current is applied from the first drive device, the upper contact protrusion may make the yoke part move relatively in one direction.

The lower contact protrusions may include a first lower contact protrusion which is selectively in contact with the second slide protrusion, and a second lower contact protrusion which is selectively in contact with the first slide protrusion, such that when the second slide protrusion is in contact with the first lower contact protrusion, the first slide protrusion is in contact with the second lower contact protrusion, and when current is applied from the second drive device, the lower contact protrusion may make the yoke part move relatively in the other direction.

Directions of the current applied to the coil through the first and second upper contact protrusions and the first and second lower contact protrusions by the first drive device and the second drive device may be opposite to each other.

A plurality of mounting spaces may be formed in the yoke part, and the upper and lower contact protrusions may be provided in the mounting spaces, respectively. A support end may protrude from each of the upper and lower contact protrusions to be provided inside the mounting space, and an elastic member may be interposed between the mounting space and the support end at a side opposite to the first and second slide protrusions.

The lower yoke may include one end that protrudes and is upwardly bent to surround the upper yoke, the coil part may be provided between the upper yoke and a bent portion of the lower yoke, and the mounting space may be formed in the bent portion of the lower yoke.

The first and second slide protrusions may be formed to be round so that concave portions thereof face each other at positions of the upper and lower portions of an exterior circumferential surface of the coil part spaced apart from each other by a predetermined interval.

BRIEF DESCRIPTION OF THE DRAWINGS

The following drawings are illustrated in order to refer to a description of some exemplary embodiments of the present invention, and the technical spirit of the present invention should not be construed as being limited to the accompanying drawings.

DETAILED DESCRIPTION OF THE EMBODIMENTS

Figure 1:
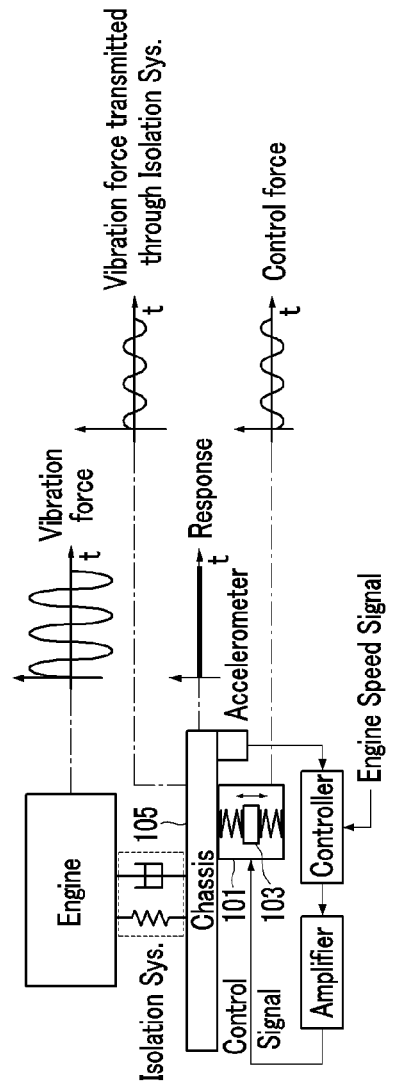
FIG. 1 (RELATED ART) is a conceptual diagram of a general active dynamic vibration absorbing system.

An exemplary embodiment of the present invention will hereinafter be described in detail with reference to the accompanying drawings.

Before this, the exemplary embodiments described in the present specification and the configuration illustrated in the drawings are simply the exemplary embodiments of the present invention, and do not represent all of the technical spirits of the present invention, and thus it should be understood that there are various equivalents and modification examples substitutable with the exemplary embodiments described in the present specification and the configuration illustrated in the drawings at the time of filing the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
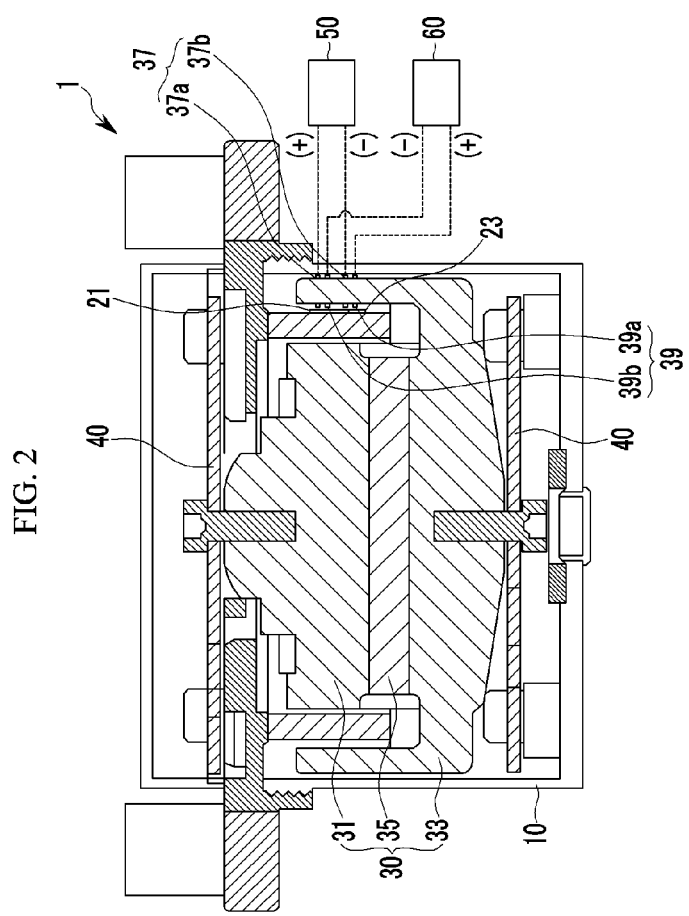
FIG. 2 is a cross-sectional view of a configuration of an active dynamic vibration absorber according to an exemplary embodiment of the present invention.
Figure 3:
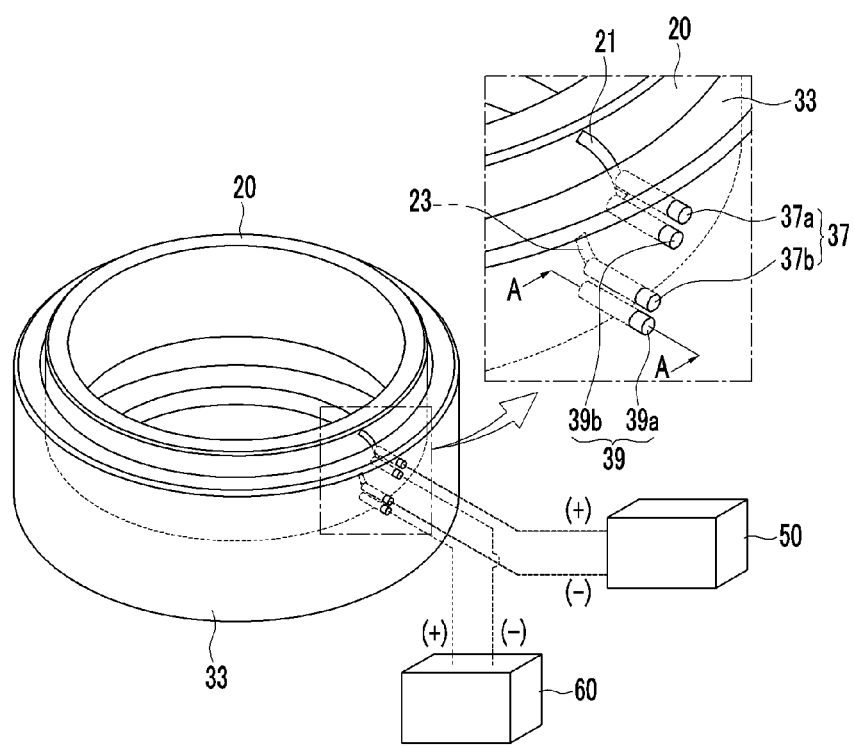
FIG. 3 is a perspective view of a coil part and a lower yoke applied to the active dynamic vibration absorber according to the exemplary embodiment of the present invention.

FIG. 2 is a cross-sectional view of a configuration of an active dynamic vibration absorber according to an exemplary embodiment of the present invention. FIG. 3 is a view of a coil part and a lower yoke applied to the active dynamic vibration absorber according to the exemplary embodiment of the present invention, FIG. 4 is a front view of the coil part and the lower yoke in the active dynamic vibration absorber according to the exemplary embodiment of the present invention, and FIG. 5 is a cross-sectional view taken along line A-A of FIG. 3.

An active dynamic vibration absorber 1 according to an exemplary embodiment of the present invention includes, as illustrated in FIG. 2, a coil part 20 provided inside a housing 10 and having a coil wound therein, and a yoke part 30 configured to move by electric force when current flows in the coil part 20, where the coil part 20 has a predetermined mass and includes an upper yoke 31, a lower yoke 33, and a permanent magnet 35 provided between the upper yoke 31 and the lower yoke 33. Further, the active dynamic vibration absorber 1 includes springs 40, such as leaf springs, for example, mounted in an upper portion and a lower portion of the yoke part 30, respectively, so that a movement of the yoke part 30 is switched to a vibration, i.e., causes a control vibration. The coil is wound around the coil part 20 so that an electromagnetic field is formed in one direction or the other direction according to a direction of the current applied to the coil. As shown in FIG. 2, the springs 40 are mounted in the upper portion and the lower portion of the yoke part 30, respectively, but are not limited to the depicted configuration.

Figure 4:
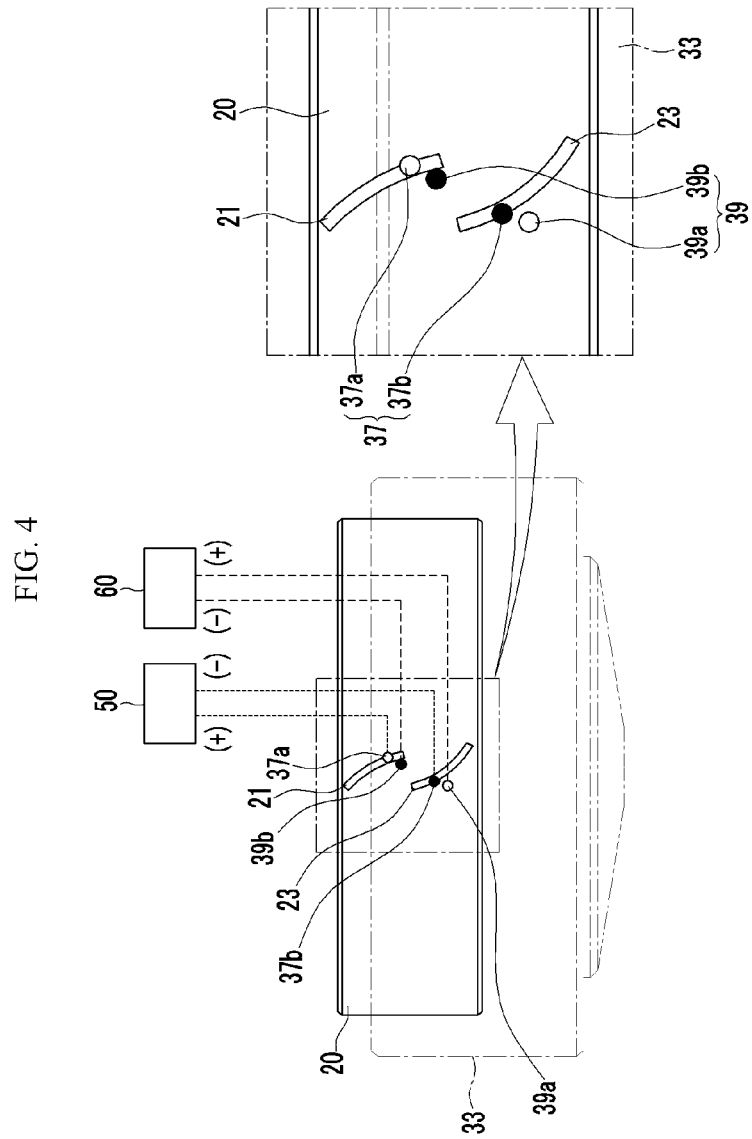
FIG. 4 is a perspective front view of the coil part and the lower yoke in the active dynamic vibration absorber according to the exemplary embodiment of the present invention.
Figure 5:
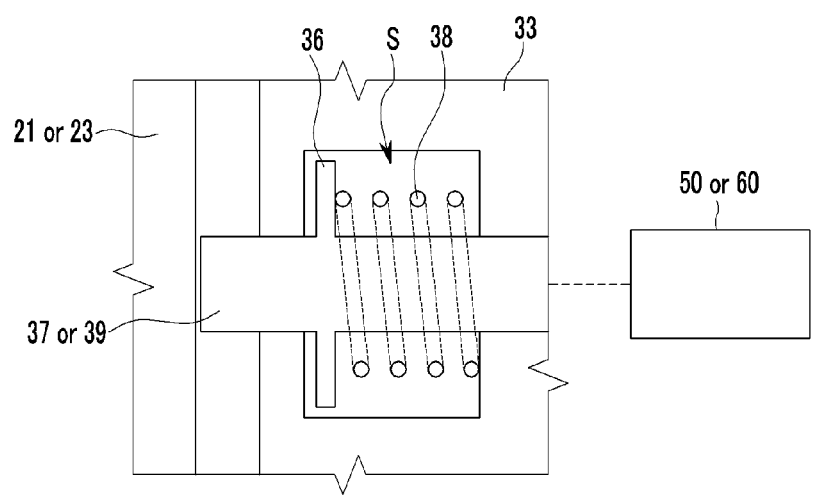
FIG. 5 is a cross-sectional view taken along line A-A of FIG. 3.

The active dynamic vibration absorber 1 according to the exemplary embodiment of the present invention includes, as illustrated in FIGS. 3 and 4, first and second slide protrusions 21 and 23, upper and lower contact protrusions 37 and 39, and a plurality of drive devices 50 and 60. Preferably, the first and second slide protrusions 21 and 23 protrude from an exterior circumferential surface of the coil part 20 at one side of the coil part 20. As shown in FIG. 3, the first and second slide protrusions 21 and 23 are formed to an upper portion and a lower portion of the coil part 20, but are not limited to the depicted configuration. In particular, the first and second slide protrusions 21 and 23 may be formed to be round so that concave portions thereof face each other at positions spaced apart from each other by a predetermined interval in the upper and lower portions of the exterior circumferential surface of the coil part 20.

The first and second slide protrusions 21 and 23 are electrically connected with both ends of the coil, respectively. In the present exemplary embodiment, a plurality of upper and lower contact protrusions 37 and 39 are formed in upper and lower portions at one side of the lower yoke 33, respectively, to correspond to the first and second slide protrusions 21 and 23.

Further, the number of drive devices 50 and 60 preferably is two, and the drive devices 50 and 60 are electrically connected to the upper and lower contact protrusions 37 and 39, and selectively apply current to the upper and lower contact protrusions 37 and 39 according to a control signal, to generate Lorentz force between the coil part 20 and the yoke part 30 in a vertical direction. The drive devices 50 and 60 include the first drive device 50 connected with the upper contact protrusion 37 to apply current to the coil part 20, and the second drive device 60 connected with the first drive device 50 and the lower contact protrusion 39 to apply current to the coil part 20.

In particular, the upper and lower contact protrusions 37 and 39 may selectively change a direction of the current flowing in the coil part 20 by making the current applied from the drive device 50 or 60 flow from the first slide protrusion 21 to the second slide protrusion 23, or the current applied from the drive device 50 or 60 flow from the second slide protrusion 23 to the first slide protrusion 21.

In the present exemplary embodiment, the upper contact protrusion 37 includes a first upper contact protrusion 37a and a second upper contact protrusion 37b. The first upper contact protrusion 37a is formed in an upper portion at one side of the lower yoke 33, and is selectively in contact with the first slide protrusion 21. Further, the second upper contact protrusion 37b is formed in a lower portion of at the one side of the lower yoke 33, and is selectively in contact with the second slide protrusion 23.

In the present exemplary embodiment, the lower contact protrusion 39 includes a first lower contact protrusion 39a and a second lower contact protrusion 39b. The first lower contact protrusion 39a is formed in the lower portion at the one side of the lower yoke 33 under the second upper contact protrusion 37b, and is selectively in contact with the second slide protrusion 23. Further, the second lower contact protrusion 39b is formed in an upper portion of the one side of the upper yoke 33 between the first and second upper contact protrusion 37a and 37b, and is selectively in contact with the first slide protrusion 21.

As shown in FIGS. 2-5, each of the first upper contact protrusion 37a, the second upper contact protrusion 37b, the first lower contact protrusion 39a, and the second lower contact protrusion 39b is formed in the lower yoke 33, but the first upper contact protrusion 37a, the second upper contact protrusion 37b, the first lower contact protrusion 39a, and the second lower contact protrusion 39b are not limited thereto, and may be formed in the upper yoke 31.

When the first drive device 50 applies the current, such that the first upper contact protrusion 37a is in contact with the first slide protrusion 21, and the second upper contact protrusion 37b is in contact with the second slide protrusion 23, the applied current may flow in the following sequence: the first drive device 50, the first upper contact protrusion 37a, the first slide protrusion 21, the coil, the second slide protrusion 23, the second upper contact protrusion 37b, and the first drive device 50.

When the second drive device 60 applies the current, such that the first lower contact protrusion 39a is in contact with the second slide protrusion 23, and the second lower contact protrusion 39b is in contact with the first slide protrusion 21, the applied current may flow in the following sequence: the second drive device 60, the first lower contact protrusion 39a, the second slide protrusion 23, the coil, the first slide protrusion 21, the second lower contact protrusion 39b, and the second driver 60.

However, when a direction of the coil is changed to be reverse to the direction as shown in FIGS. 2-5, the direction of the applied current may be configured to be reverse.

The upper and lower contact protrusions 37 and 39 as described above may be slidably mounted while protruding toward an exterior circumferential surface of the coil part 20 in a mounting space S formed inside the lower yoke 33 in response to the coil part 20 as illustrated in FIG. 5. A support end 36 may protrude inside the mounting space S in the upper and lower contact protrusions 37 and 39, and an elastic member 38 may be interposed between the mounting space S and the support end 36 at an opposite side of the first and second slide protrusions 21 and 23. In the present exemplary embodiment, the elastic member 38 may be formed of a coil spring of which one end of the elastic member 38 is supported by the support end 36, and the other end is supported by the mounting space S.

Referring to FIGS. 2, 3, and 5, one end of the lower yoke 33 protrudes and is upwardly bent to surround the upper yoke 31, the coil part 20 is provided between the upper yoke 31 and a bent portion of the lower yoke 33, and the mounting space S is formed in the bent portion of the lower yoke 33, but the present invention is not limited thereto, and the configurations of the lower yoke 33 and the upper yoke 31 may be formed in reverse, and the mounting space S may be formed in the upper yoke 31.

When the current is applied from the respective drive devices 50 and 60, the upper and lower contact protrusions 37 and 39 supply the current to the first and second slide protrusions 21 and 23 of the coil part 20, and the direction of the current is selectively switched according to the respective contacting protrusions. The upper and lower contact protrusions 37 and 39 may be electrically insulated from the lower yoke 33. In this case, the Lorentz force generated in the coil part 20 makes the lower yoke 33 move relatively in an upper direction or a lower direction. In particular, the upper and lower contact protrusions 37 and 39 may maintain a state where the upper and lower contact protrusions 37 and 39 are stably in contact with the first and second slide protrusions 21 and 23 by elastic force of the elastic member 38 inside the mounting space S.

Hereinafter, operation of the active dynamic vibration absorber 1 according to the exemplary embodiment of the present invention including the aforementioned configuration will be described in detail.

Figure 6:
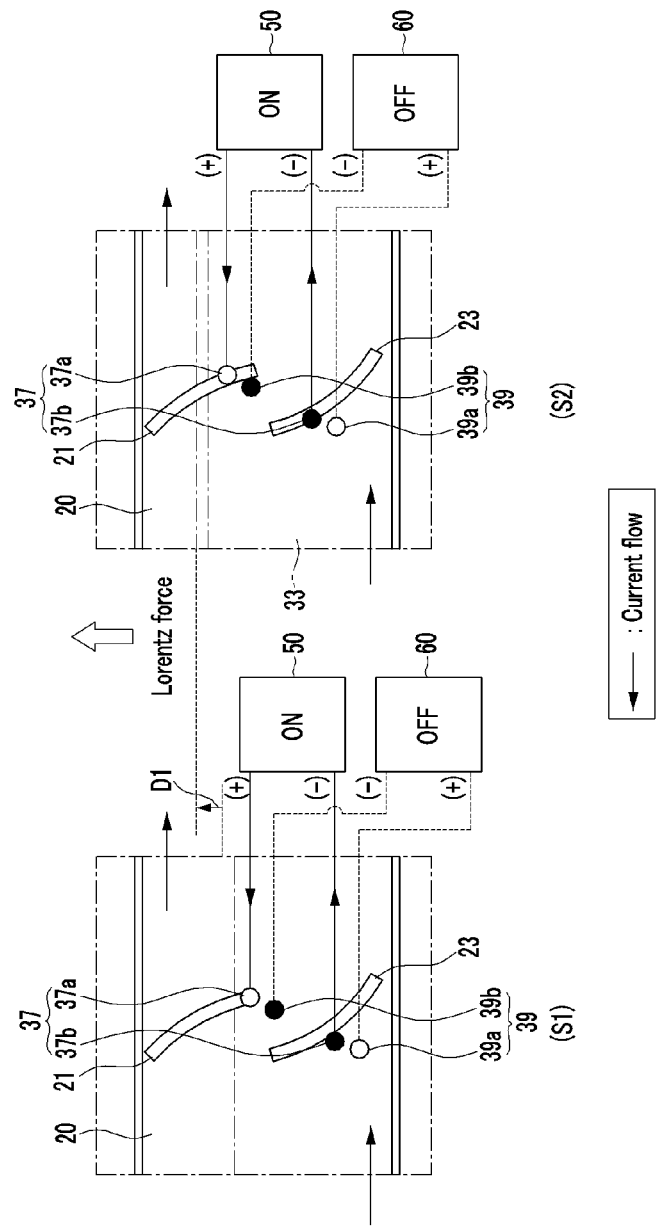
FIGS. 6 and 7 are operation state views for each step of the active dynamic vibration absorber according to the exemplary embodiment of the present invention.
Figure 7:
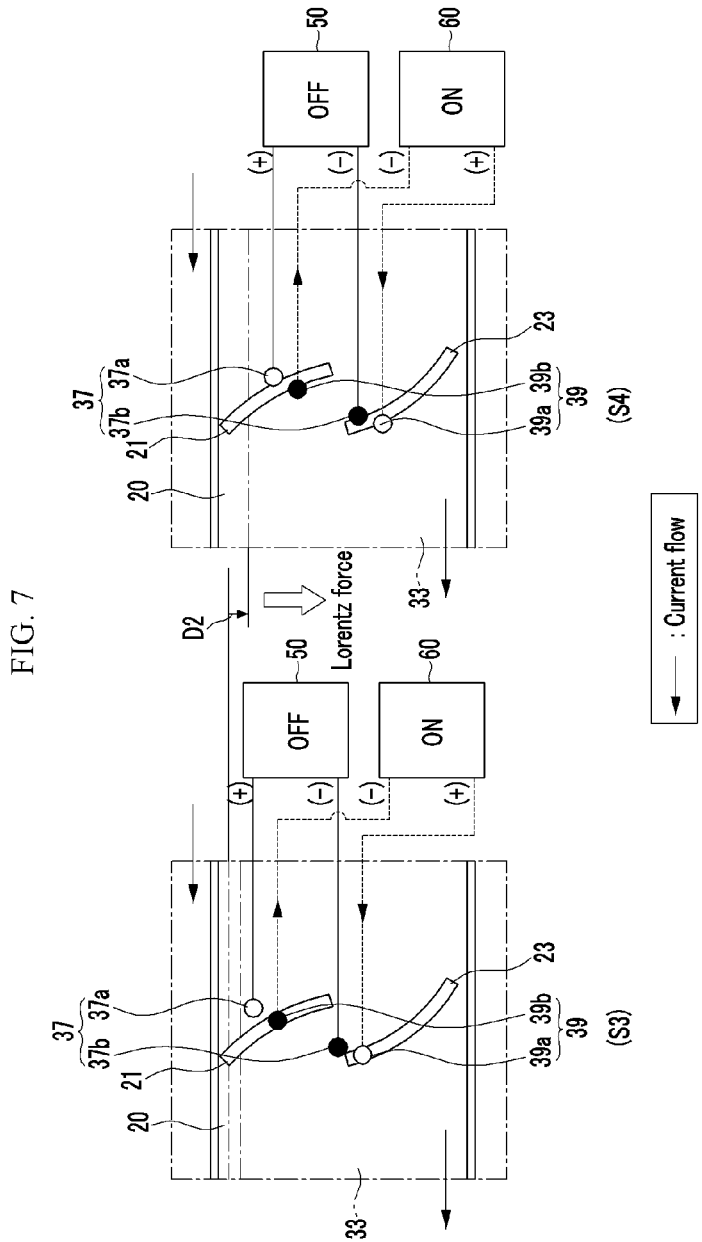

FIGS. 6 and 7 are operation state views for each step of the active dynamic vibration absorber according to the exemplary embodiment of the present invention.

First, as illustrated in S1 of FIG. 6, the first drive device 50 starts an operation (ON) in a state where the first upper contact protrusion 37a and the second upper contact protrusion 37b are in contact with the first and second slide protrusions 21 and 23, respectively, to supply the current to the first upper contact protrusion 37a.

Then, the current supplied to the first upper contact protrusion 37a flows along the coil part 20 from the first slide protrusion 21, and then flows to the first drive device 50 through the second slide protrusion 23 and the second upper contact protrusion 37b. In this case, the second drive device 60 maintains a state where the operation of the second drive device 60 is stopped (OFF), and the current flowing from the first slide protrusion 21 to the second slide protrusion 23 along the coil part 20 generates, for example, Lorentz force toward the upper portion of the coil part 20. The Lorentz force generated from the coil part 20 toward the upper portion moves the lower yoke 33 positioned in the lower portion of the coil part 20 as illustrated in S1 of FIG. 6 in the upper direction by a predetermined length D1 as illustrated in S2 of FIG. 6.

In the meantime, the second drive device 60 starts the operation (ON) in a state where the first lower contact protrusion 39a and the second lower contact protrusion 39b are in contact with the lower and first slide protrusions 23 and 21, respectively, as illustrated in S3 of FIG. 7, to supply the current to the first lower contact protrusion 39a. Then, the current supplied to the first lower contact protrusion 39a flows from the second slide protrusion 23 along the coil part 20, and then flows to the second drive device 60 through the first slide protrusion 21 and the second lower contact protrusion 39b. In this case, the first drive device 50 maintains a state where an operation of the first drive device 50 is stopped (OFF), and the current flowing to the first slide protrusion 21 from the second slide protrusion 23 along the coil part 20 generates Lorentz force toward the lower portion of the coil part 20. The Lorentz force generated from the coil part 20 toward the upper portion moves the lower yoke 33 positioned in the upper portion of the coil part 20 as illustrated in S3 of FIG. 7 in the lower direction by a predetermined length D2 as illustrated in S4 of FIG. 7. That is, the active dynamic vibration absorber 1 according to the present exemplary embodiment changes a direction of the flow of the current according to the selective operation of the first and second drive devices 50 and 60 to repeatedly change a phase of the Lorentz force.

Then, as described above, the position of the lower yoke 33 repeatedly moves in the upper and lower directions based on the coil part 20, which moves the entire yoke part 30 in the upper and lower directions inside the housing 10, so that a vibration (that is, a control vibration) is generated in the active dynamic vibration absorber 1. In particular, the yoke part 30 is magnetized by the permanent magnet 35 to form an electromagnetic field around the yoke part 30. In this case, the direction of the flow of the current applied from the first and second drive devices 50 and 60 is switched when the relative movement of the yoke part 30 and the coil part 20 is generated by the first and second slide protrusions 21 and 23 and the upper and lower contact protrusions 37 and 39. In particular, the direction of the current is repeatedly changed according to a relative position of the yoke part 30 and the coil part 20 by the Lorentz force. That is, the Lorentz force applied to the coil part 20 moves the yoke part 30 in a direction in which the force is applied, and thus the contact of the respective protrusions is changed, so that the direction of the current flowing in the coil part 20 is changed. Accordingly, a phenomenon in which the direction of the Lorentz force applied to the yoke part 30 is changed is repeated. Through the aforementioned process, the vibration is generated by the relative movement of the yoke part 30 and the coil part 20, that is, the reciprocating movement of the yoke part 30.

The Lorentz force is proportional to the number of windings of the coil, a magnetic flux, a length of a conducting wire, and intensity of current, so that the respective drive devices 50 and 60 may control the vibration of the active dynamic vibration absorber 1 by controlling intensity of the current.

Accordingly, the active dynamic vibration absorber 1 according to the exemplary embodiment of the present invention including the aforementioned configuration switches the direction of the current applied to the coil part 20 by using the periodical relative movement of the yoke part 30 with respect to the coil part 20, and through the switch of the direction of the current, the direction of the Lorentz force is adjusted and an intensity of the current is simultaneously controlled, so that it is possible to efficiently generate the vibration by adjusting the magnitude of the Lorentz force.

Further, the yoke part 30, which is an operation mass, is operated only with a unidirectional control signal, so that it is possible to remove the H-Bridge circuit applied for generating a control signal in a forward direction (+) and a reverse direction (−), or a free wheel applied for protecting a device and improving efficiency in the related art, thereby reducing a manufacturing cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An active dynamic vibration absorber, comprising:
   a coil part provided inside a housing and wound with a coil;
   a yoke part that moves with respect to the coil part when current flows in the coil part, and includes an upper yoke, a lower yoke, and a permanent magnet provided between the upper yoke and the lower yoke;
   springs mounted to the yoke part so as to switch a movement of the yoke part to a vibration;
   first and second slide protrusions electrically connected to both ends of the coil of the coil part, respectively, and protruding from an exterior circumferential surface of the coil part;
   a plurality of upper and lower contact protrusions formed in the yoke part to correspond to the first and second slide protrusions, and being selectively in contact with the first and second slide protrusions, respectively; and
   first and second drive devices electrically connected to the upper and lower contact protrusions, respectively, and generating a relative movement between the coil part and the yoke part by selectively applying current to the respective upper and lower contact protrusions according to a control signal.

2. The active dynamic vibration absorber of claim 1, wherein:
   the first and second slide protrusions are provided on the exterior circumferential surface of the coil part spaced apart from each other by a predetermined interval.

3. The active dynamic vibration absorber of claim 1, wherein:
   the upper contact protrusions include a first upper contact protrusion which is selectively in contact with the first slide protrusion, and a second upper contact protrusion which is selectively in contact with the second slide protrusion, such that when the first slide protrusion is in contact with the first upper contact protrusion, the second slide protrusion is in contact with the second upper contact protrusion, and when the current is applied from the first drive device, the upper contact protrusion makes the yoke part move relatively in one direction.

4. The active dynamic vibration absorber of claim 3, wherein:

the lower contact protrusions include a first lower contact protrusion which is selectively in contact with the second slide protrusion, and a second lower contact protrusion which is selectively in contact with the first slide protrusion, such that when the second slide protrusion is in contact with the first lower contact protrusion, the first slide protrusion is in contact with the second lower contact protrusion, and when the current is applied from the second drive device, the lower contact protrusion makes the yoke part move relatively in the other direction.

5. The active dynamic vibration absorber of claim 4, wherein:

directions of the current applied to the coil through the first and second upper contact protrusions and the first and second lower contact protrusions by the first drive device and the second drive device are opposite to each other.

6. The active dynamic vibration absorber of claim 1, wherein:

a plurality of mounting spaces are formed in the yoke part, and the upper and lower contact protrusions are provided in the mounting spaces, respectively.

7. The active dynamic vibration absorber of claim 6, wherein:

a support end protrudes from each of the upper and lower contact protrusions to be provided inside the mounting space, and an elastic member is interposed between the mounting space and the support end at a side opposite to the first and second slide protrusions.

8. The active dynamic vibration absorber of claim 6, wherein:

the lower yoke includes one end that protrudes and is upwardly bent to surround the upper yoke, the coil part is provided between the upper yoke and a bent portion of the lower yoke, and the mounting space is formed in the bent portion of the lower yoke.

9. The active dynamic vibration absorber of claim 1, wherein:

the first and second slide protrusions are formed to be round so that concave portions thereof face each other at positions of the upper and lower portions of an exterior circumferential surface of the coil part spaced apart from each other by a predetermined interval.

10. An active dynamic vibration absorber, comprising:

a coil part provided inside a housing and wound with a coil;

a yoke part that moves with respect to the coil part when current flows in the coil part;

springs mounted to the yoke part so as to switch a movement of the yoke part to a vibration;

first and second slide protrusions electrically connected to both ends of the coil of the coil part, respectively, and protruding from an exterior circumferential surface of the coil part;

a plurality of upper and lower contact protrusions formed in the yoke part to correspond to the first and second slide protrusions, and being selectively in contact with the first and second slide protrusions, respectively; and first and second drive devices electrically connected to the upper and lower contact protrusions, respectively, and applying current to the respective upper and lower contact protrusions according to a control signal.

* * * * *